Feb. 18, 1947. L. S. MARSHALL 2,415,831
INSTRUMENT FLYING TRAINER ATTACHMENT FOR SIMULATING RADIO STATIC
Filed Jan. 1, 1945  2 Sheets-Sheet 1
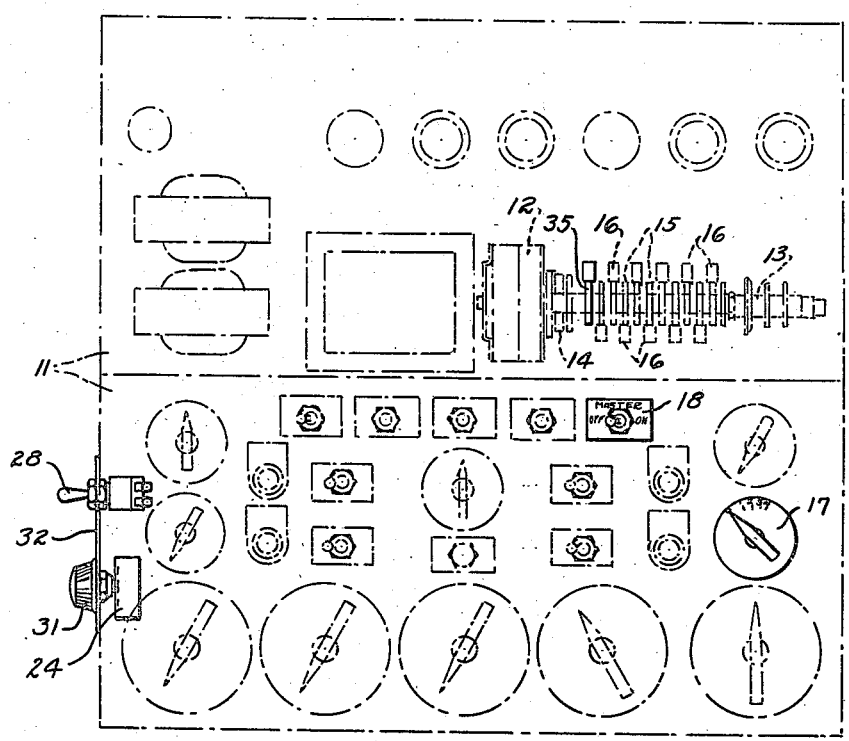
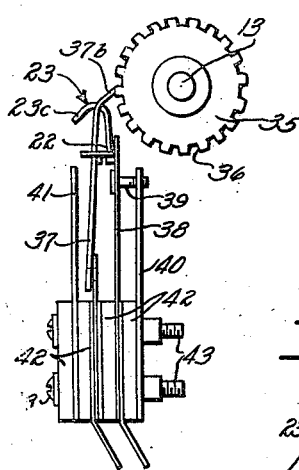
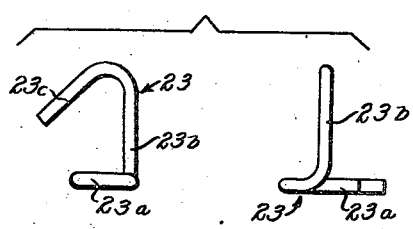
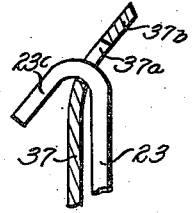
INVENTOR.
LELAND S. MARSHALL
BY Joseph Cb. Hagell
and
Chade Koonty
ATTORNEYS Feb. 18, 1947. L. S. MARSHALL 2,415,831
INSTRUMENT FLYING TRAINER ATTACHMENT FOR SIMULATING RADIO STATIC
Filed Jan. 1, 1945 2 Sheets-Sheet 2

INVENTOR.
LELAND S. MARSHALL
BY
ATTORNEYS

Patented Feb. 18, 1947

2,415,831

UNITED STATES PATENT OFFICE 2,415,831

INSTRUMENT FLYING TRAINER ATTACHMENT FOR SIMULATING RADIO STATIC

Leland S. Marshall, Dayton, Ohio

Application January 1, 1945, Serial No. 570,935

6 Claims. (Cl. 35—10)

(Granted under the act of March 3, 1883, as amended April 30, 1928; 370 O. G. 757)

The invention described herein may be manufactured and used by or for Government for governmental purposes, without the payment to me of any royalty thereon.

This invention relates to attachments for instrument flying trainers, especially attachments for the standard Link radio chassis, made by Link Aviation Devices, Inc., Binghamton, New York, and used by the Army and Navy in training aviators in such maneuvers as simulated position finding, boxing the station (aural null let-down), radio compass let-down, flying the radio ranges etc. The standard Link radio chassis includes a keyer, which is essentially a shaft rotated by a constant speed motor at a low speed, said shaft carrying a number of cams which are engaged by contacts to make and break a variety of circuits which control the tones or signals heard in the earphones of the student. In one form of radio chassis, there are five station identification cams (for sending out signals like those of five different radio stations), four fan marker cams, a Navy landing marker cam, an A—N cam (for creating the well known A and N signals emitted by a radio range), two switching cams and a ratchet cam. In accordance with the preferred embodiment of the invention, one of the five station identification cams is removed and replaced by a special cam which has a contact bearing against its roughened periphery, and a brush loosely mounted on said contact is intermittently connected in a circuit which is coupled with the earphones, the result being that irregular, crackling sounds, which cannot be distinguished from radio static, are heard by the student, and these sounds interrupt and intermingle with the A—N, station identification and other signals initiated by the keyer as indicated above. Thus the student may be trained to recognize aural signals which are distorted or even occasionally overpowered by the simulated static.

The broad object of the invention is, as indicated above, to improve the training of student pilots. More specifically, the invention seeks to provide an attachment which almost perfectly simulates radio static for a Link trainer. Other objects are to provide an attachment of the character indicated which is inexpensive to make and is quickly and easily installed, which does not materially detract from the efficiency and usefulness of the Link radio chassis, and which can be used with other types of instrument flying trainers.

In the accompanying drawings showing a preferred embodiment of the invention,

Fig. 1 is a phantom plan view of the Link radio chassis, showing the switch and potentiometer for controlling the simulated static and other special parts in full lines;

Fig. 2 is a detail in elevation of the specially shaped cam and the brush cooperating therewith to simulate static, in accordance with the invention;

Fig. 3 is a group of three views (side elevation, end elevation and bottom plan) of the wire which forms the brush, on a large scale;

Fig. 4 is a fragmentary sectional view on a large scale showing the brush suspended on its movable contact.

Figure 5:
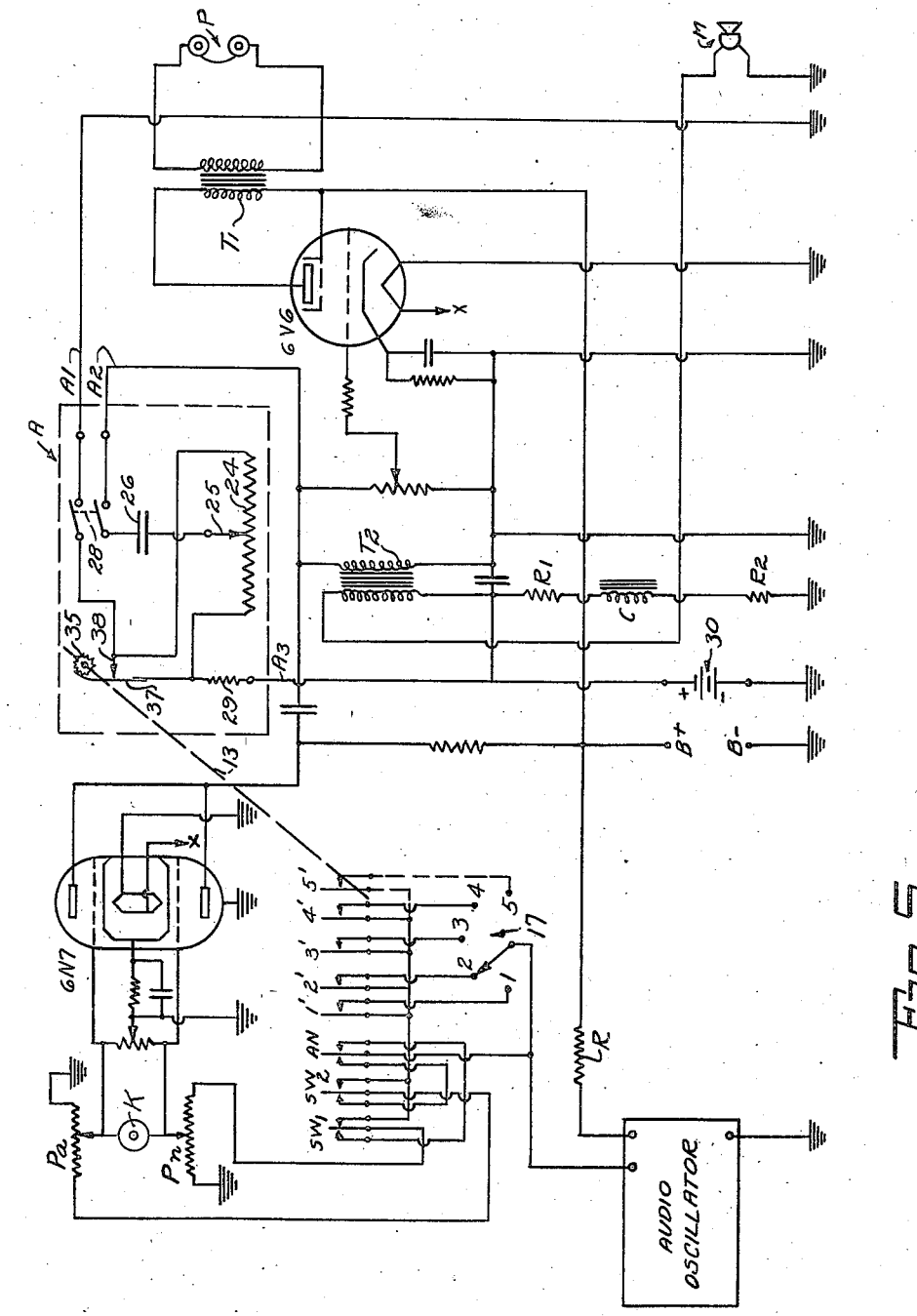
Fig. 5 is a wiring diagram showing the improvement and its connections with the radio chassis circuit.

Referring particularly to the drawings, Fig. 1 shows a Link trainer radio chassis 11 having a radio range keyer comprising a constant speed motor 12 such as a "Telechron" motor, slowly driving a shaft 13 through reduction gearing 14. Shaft 13 has fixed thereto a number of cams 15 not necessary to describe, each actuating movable contacts 16 which bear against the peripheries of said cams, to create various signals in a radio circuit which is omitted because of its complexity. A station identification selector switch 17 and a master switch 18 are also indicated. All these and other parts of the radio chassis form no part of the present invention.

Referring to Fig. 5 a radio static simulating circuit A, enclosed within a broken line rectangle, is coupled into the main circuit of a standard ground trainer radio chassis by means of three connecting wires A1, A2 and A3. The main circuit itself comprises principally a vacuum tube audio oscillator to provide a code note or source of audio current capable of being fed into the circuit, and producing signals upon interruption by the keyer assembly. The oscillator is connected to the B+ line through a resistance R and is connected directly to the selector switch 17, the same terminal of the switch being further connected to the AN signal switch, as shown.

In the standard ground trainer radio circuit the selector switch contacts 1 to 5 connect with cam actuated switches 1' to 5', the cams for said switches operating to simulate the code symbols of five separate stations. The selected station identification signal can thus be fed into the radio circuit by operation of the selector switch 17. The AN signal switch is also cam actuated to produce A and N signals simulating the effect obtained in instrument flying on a radio range. Operation of switches SW1 and SW2 in timed relation by appropriate cam actuated means closes circuits which feed either the AN signals or the station identification signal into the radio circuit in predetermined sequence and for predetermined intervals of time. Between the axes or zones where the A signal or N signal are of maximum volume, the A and N signals are received together in varying relative volumes, and to simulate this effect the standard trainer radio circuit employs a pair of potentiometers Pa and Pn controlled by a single knob K to increase the A signal volume and decrease the N signal volume at the same time or vice versa. These AN signals, as well as station identification signals, are fed into a vacuum tube (6N7) circuit and the output therefrom is passed on to an amplifier circuit using a 6V6 tube for example. The amplified signal output is coupled to a telephone headset P by means of a transformer T1. A microphone M may be used if desired to feed voice signals into the amplifier circuit. The radio circuit so far described is conventional in ground trainer radio practice and per se this circuit forms no part of the present invention. This circuit is shown as an example but other similar circuits differing in minor details might be used if desired, as for instance the radio circuit of the Blenman Patent No. 2,359,294, of October 3, 1944.

In accordance with the present invention the contact 5 and switch 5' of the selector switch assembly are disconnected, and the cam for station identification switch 5' is removed from shaft 13 and replaced by a notched cam 35 as indicated diagrammatically in Fig. 5. A movable contact 37 incorporated in the static simulator switch, to be described below, has an end portion 37b adapted to be moved laterally by means of cam 35 to thus make and break a shunt across a potentiometer 24. The potentiometer includes a movable contact 25, the position of which determines the volume of the simulated static disturbance fed into the radio circuit through leads A2 and A3. A condenser 26 is connected in series with the contact 25 and one terminal of a double-pole single-throw on-and-off switch 28, the latter having a pair of output terminals connected to leads A1 and A2. A fixed contact 38 of the static simulator switch is connected to the remaining terminal of the on-and-off switch 28 and is also connected to one end of the potentiometer resistance unit. The other end of the latter is connected to movable switch contact 37 and through a resistor 29 is connected also to output lead A3 of the static simulating circuit A. As may be seen in Fig. 5 the leads A2 and A3 of the circuit A are connected to the input of the amplifier circuit, while lead A1 is connected to the ground. To produce a voltage drop across the potentiometer resistance unit, there is provided a battery 30 connected between the lead A3 and the ground.

Obviously the radio static simulating circuit will be dead until switch 28 is closed, and the intensity of the current flowing through it will be controlled by potentiometer 24. More specifically the volume of the simulated static will increase as the contact 25 of the potentiometer is moved to the right in Fig. 5, to connect the leads A2 and A3 across a larger portion of the potentiometer resistance unit. The position of the contact 25 may be regulated by a knob 31 mounted on a small panel 32, which serves to carry the potentiometer and also the on-and-off switch 28 (see Fig. 1). Closing of the contacts 37 and 38 short circuits the potentiometer resistance unit, which reduces the potential across leads A2 and A3 to zero. The irregular opening and closing of the contacts thus causes an intermittent potential to be introduced into the main radio circuit through the leads A2 and A3.

The static simulator switch, which forms an essential part of the radio static simulating circuit A, comprises the movable and fixed contacts 37 and 38 which as shown in Fig. 2 have terminal extensions mounted between insulating blocks 42. The means to effect an irregular or intermittent circuit interruption in response to lateral movement of the movable contact 37 comprises a brush 23 movably mounted on contact 37 in a particular manner to be presently described in detail.

The brush 23 is made of spring wire bent into a loop 23a which loosely surrounds the movable contact 37 which carries the brush. A straight shank 23b extends upwardly from loop 23a and is bent over and downwardly at the end, 23c, after being inserted through an aperture 37a (Fig. 4) in the upper end of the movable contact 37. Thus the brush is swingably supported by contact with the edge of aperture 37a and may move slightly relative to contact 37 in all directions. The bent end 23c prevents the brush from falling off due to the vibrations to which it is subjected.

Referring to Fig. 2, the keyer shaft 13 carries a special notched cam 35 which is generally circular, being made of an insulator such as a phenolic condensation product, and having notches 36 in its periphery which are of irregular depth and spacing. The depth of the notches may vary between $\frac{3}{32}$ in. and $\frac{1}{16}$ in. and the spacing may range between $\frac{1}{8}$ in. and $\frac{3}{16}$ in. Movable contact 37, which is electrically connected with a terminal extension, rides over the notched periphery of the cam, having a bent end 37b for this purpose, and thus moves toward and from fixed contact 38. Fixed contact 38 may be adjusted relative to the movable contact by means of a screw 39 passing through contact 38 and through a stop 40. Another stop 41 is on the opposite side of movable contact 37. Stops 40 and 41 are relatively stiff metal pieces which are insulated by blocks 42, and screws 43 secure the insulating blocks, the contact members and the stops together, as clearly shown, to form a unit which may be assembled on the keyer of Fig. 1. Cam 35 when rotated will cause movable contact 37 to move relative to fixed contact 38, and when this occurs, brush 23 will swing on the movable contact, touching the fixed contact 38 at irregular intervals due to the irregular spacing of notches 36. This will make and break the circuit and because of the varying depth of said notches and the consequently varying movement of brush 23 and movable contact 37, an irregular sound, exactly like radio static, will be emitted from the earphones.

The result of using the described improvement is all that may be desired. Sounds indistinguishable from radio static, whose intensity may be gradually increased and decreased by control of the potentiometer, are heard in the student's earphones, intermingled with and superimposed on station identification and other signals. Thus the student is subjected, at the will of the instructor, to conditions such as he would encounter if flying near or through a severe electrical storm, and his training better fits him for actual flying.

Having described the invention, what I claim as new and desire to secure by Letters Patent is:

1. In combination with the radio circuit of an instrument flying trainer, wherein said circuit includes a source of audio current to be fed to a keying device for simulation of station identification and other signals normally received during flight along a radio range, said circuit further comprising a telephone receiver for audible reception of said station identification and other signals; the improvement comprising a keying device having a rotary shaft carrying switch actuating cams effective to open and close switches governing the aforementioned station identification and other signals, a notched cam on said shaft having irregularly spaced notches, a movable contact member engaging said notched cam, a fixed contact member toward and from which the movable contact member moves as said notched cam revolves, a brush movably mounted on said movable contact member and having a portion extending toward said fixed contact member to close a circuit through said contact members at irregular intervals, a circuit including said contact members and a potentiometer, and means connecting the latter circuit into said radio circuit to superimpose irregular electrical impulses simulating radio static on the aforementioned station identification and other signals as received by said telephone receiver.

2. In combination with a power operated rotary shaft, a pair of relatively movable and separable contacts; a circuit comprising said contacts, an earphone and a source of electricity; means on the shaft for separating said contacts irregularly both in space and in time; and means on one of said contacts for closing a circuit through the contacts at irregular intervals as determined by the irregular separation of said contacts.

3. The invention according to claim 2, wherein one of the contacts is movable and the other is stationary, and the means for short circuiting the contacts consists of a metal brush loosely supported on the movable contact to swing and move slightly in all directions relative to its supporting contact.

4. In a radio circuit for an instrument flying trainer of the character including a source of audio current and keying means to selectively key the audio current to produce station identification and other signals for reception by a telephone receiver included in said circuit; a second circuit connected to said radio circuit including means to superimpose irregular electrical impulses simulating radio static on the aforementioned station identification and other signals transmitted through said radio circuit to the telephone receiver, and said second circuit also including volume control means for adjusting the magnitude of said irregular electrical impulses.

5. In a radio circuit as defined by claim 4, means included in said second circuit to irregularly make and break a pair of contacts comprising, a relatively fixed contact, a relatively movable contact adjacent thereto and having an end portion extending into contact with a rotatable cam having irregularly spaced notches therein, a brush swingably mounted on said relatively movable contact and having a contact bridging portion lying between the relatively fixed and movable contacts, and means to adjust the position of the relatively fixed contact with respect to the relatively movable contact.

6. In combination with the radio circuit of an instrument flying trainer, wherein said circuit includes a source of audio current to be fed to a keying device for simulation of signals normally received during flight along a radio range, said circuit further comprising a telephone receiver for audible reception of said signals; the improvement comprising a keying device having a rotary shaft carrying switch actuating cams effective to open and close switches governing the aforementioned signals, a cam on said shaft having irregularly spaced notches, a static simulator switch having a movable element engaging said notches, a circuit including said static simulator switch and a potentiometer, and means connecting the latter circuit into said radio circuit to superimpose irregular electrical impulses simulating radio static on the aforementioned signals as received by said telephone receiver.

LELAND S. MARSHALL.

REFERENCES CITED

The following references are of record in the file of this patent:

UNITED STATES PATENTS

| Number | Name | Date |
| --- | --- | --- |
| 2,341,222 | Lancaster | Feb. 8, 1944 |
| 2,298,305 | Muller | Oct. 13, 1942 |
| 2,312,962 | De Florez et al. | Mar. 2, 1943 |